(12) United States Patent
Sato (10) Patent No.: US 11,101,678 B2
(45) Date of Patent: Aug. 24, 2021

(54) ELECTRONIC DEVICE THAT RECEIVES POWER AND METHOD FOR CONTROLLING THE SAME

(71) Applicant: CANON KABUSHIKI KAISHA, Tokyo (JP)

(72) Inventor: Yasuhiro Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/291,611

(22) Filed: Mar. 4, 2019

(65) Prior Publication Data

US 2019/0280510 A1    Sep. 12, 2019

(30) Foreign Application Priority Data

Mar. 6, 2018 (JP) .............................. JP2018-040123

(51) Int. Cl.
  *H02J 7/00* (2006.01)
  *H02J 7/02* (2016.01)
  *G06F 9/30* (2018.01)

(52) U.S. Cl.
  CPC ...... *H02J 7/007184* (2020.01); *G06F 9/3004* (2013.01); *H02J 7/00* (2013.01); *H02J 7/00712* (2020.01); *H02J 7/025* (2013.01)

(58) Field of Classification Search
  CPC ....................................................... H02J 7/00
  USPC ....................................................... 320/162
  See application file for complete search history.

(56) References Cited

U.S. PATENT DOCUMENTS

| 8,638,072 | B2 | 1/2014 | Vilhauer et al. | |
|---|---|---|---|---|
| 9,438,058 | B2 | 9/2016 | Degura et al. | |
| 2007/0188144 | A1* | 8/2007 | Hara | G06F 1/3203 320/132 |
| 2010/0253289 | A1* | 10/2010 | Amir | H02J 7/0063 320/135 |
| 2010/0270981 | A1* | 10/2010 | Motomiya | H02J 7/0072 320/160 |
| 2012/0221868 | A1* | 8/2012 | Pocklington | G06F 1/266 713/300 |
| 2012/0249084 | A1 | 10/2012 | Vilhauer et al. | |
| 2014/0184897 | A1 | 7/2014 | Degura et al. | |
| 2017/0104361 | A1 | 4/2017 | Sato | |

FOREIGN PATENT DOCUMENTS

| JP | 2014509829 A | 4/2014 |
|---|---|---|
| JP | 2014-131401 A | 7/2014 |
| JP | 2017-073955 A | 4/2017 |
| WO | 2012/134577 A1 | 10/2012 |

* cited by examiner

*Primary Examiner* — Edward Tso
*Assistant Examiner* — Ahmed H Omar
(74) *Attorney, Agent, or Firm* — Canon U.S.A., Inc. I.P. Division (57) ABSTRACT

An electronic device comprises a power receiving unit and a control unit. The power receiving unit receives power supplied from a power supply apparatus. The control unit performs control so that a predetermined operation is limited and performs control so that a predetermined notification indicating that the predetermined operation is limited is provided, in a case in which predetermined power is not to be supplied from either the power supply apparatus or a battery to the electronic device.

19 Claims, 4 Drawing Sheets

ELECTRONIC DEVICE THAT RECEIVES POWER AND METHOD FOR CONTROLLING THE SAME

BACKGROUND

Field of the Invention

Aspects of the disclosure generally relate to an electronic device that receives power and a method for controlling the same.

Description of the Related Art

The Universal Serial Bus (USB) Type-C specification defines a connector differing from that defined by the USB 2.0 specification. Furthermore, the USB Type-C specification defines a method for notifying a power receiving apparatus of a power supply capability of a power supply apparatus. Under the USB Type-C specification, a power supply apparatus is capable of supplying power (maximum of 15 W) of a greater magnitude than power that can be supplied under the USB 2.0 specification. Furthermore, under the Universal Serial Bus Power Delivery (USB PD) specification, a power supply apparatus is capable of supplying a power receiving apparatus with 100 W power at maximum. Due to these features, under implementations of the USB Type-C specification and the USB PD specification, batteries connected to power receiving apparatuses can be charged in a short amount of time.

When a power supply apparatus conforming to the USB PD specification and a power receiving apparatus conforming to the USB PD specification are connected, the power receiving apparatus performs, with the power supply apparatus, communication (Power Negotiation communication or the like) conforming to the USB PD specification. Power to be supplied from the power supply apparatus to the power receiving apparatus is determined by performing such communication. The power supply apparatus can supply the power receiving apparatus with the power determined by performing the communication conforming to the USB PD specification.

Japanese Patent Laid-Open No. 2014-509829 discloses an apparatus including a first circuit arranged to draw currents from a charging source at multiple current levels and a second circuit arranged to determine, using the first circuit, a charging current of the charging source.

However, in a case in which a power supply apparatus supplies a power receiving apparatus with power determined by performing communication conforming to the USB PD specification, a situation can be envisioned in which the power receiving apparatus cannot receive enough power from the power supply apparatus. For example, if a USB cable is deteriorated, damaged, etc., the power receiving apparatus may not be able to receive enough power from the power supply apparatus.

SUMMARY

According to various embodiments of the present disclosure, a power receiving apparatus that receives power from a power supply apparatus and a method for controlling the power receiving apparatus can be improved.

According to various embodiments, an electronic device is provided that comprises: a power receiving unit that receives power supplied from a power supply apparatus; and a control unit that performs control so that a predetermined operation is limited and performs control so that a predetermined notification indicating that the predetermined operation is limited is provided, in a case in which predetermined power is not to be supplied from either the power supply apparatus or a battery to the electronic device.

According to various embodiments, a method is provided that comprises: determining whether or not predetermined power is to be supplied from a power supply apparatus to an electronic device; determining whether or not the predetermined power is to be supplied from a battery to the electronic device; and performing control so that a predetermined operation is limited and performing control so that a predetermined notification indicating that the predetermined operation is limited is provided, in a case in which the predetermined power is not to be supplied from either the power supply apparatus or the battery to the electronic device.

According to an aspect of the embodiments, there is provided a non-transitory storage medium storing a program for causing a computer to execute a method, the method comprising: determining whether or not predetermined power can be supplied from a power supply apparatus to an electronic device; determining whether or not the predetermined power can be supplied from a battery to the electronic device; and performing control so that a predetermined operation is limited and performing control so that a predetermined notification indicating that the predetermined operation is limited is provided, in a case in which the predetermined power is not to be supplied from either the power supply apparatus or the battery to the electronic device.

Further features of the present disclosure will become apparent from the following description of the embodiments.

DESCRIPTION OF THE EMBODIMENTS

Exemplary embodiments, features, and aspects of the disclosure will be described below with reference to the drawings. However, embodiments, features, and aspects of the disclosure are not limited to the following description of the embodiments.

First Embodiment

Figure 1:
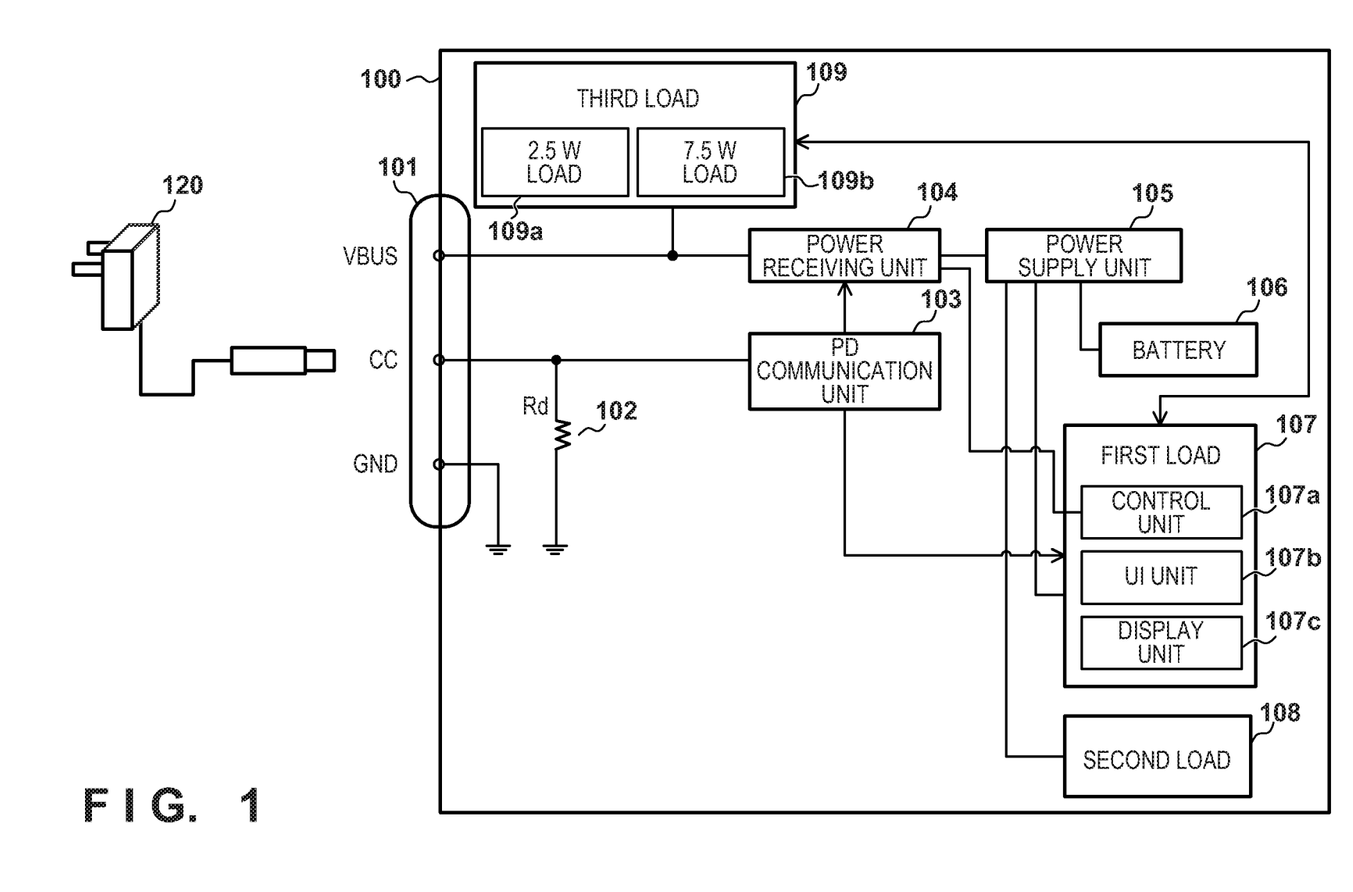
FIG. 1 is a block diagram for illustrating one example of components of an electronic device 100 according to a first embodiment.

FIG. 1 is a block diagram for illustrating one example of components of an electronic device 100 according to a first embodiment.

As shown in FIG. 1, the electronic device 100 includes a connector 101, a resistor 102, a PD communication unit 103, a power receiving unit 104, a power supply unit 105, a battery 106, a first load 107, and a second load 108. Note that, while a case in which the electronic device 100 is an electronic device that operates as an imaging device (e.g., a digital camera) is described as an example in the first embodiment, the electronic device 100 is not limited to an electronic device operating as an imaging device.

The electronic device 100 is a power receiving apparatus to which a power supply apparatus 120 is connected. While a case in which the power supply apparatus 120 is an AC-Universal Serial Bus (USB) adaptor that supplies power received from an AC power source to the electronic device 100 via a USB is described as an example in the first embodiment, the present disclosure is not limited to such a configuration. For example, in other embodiments, the power supply apparatus 120 may be a personal computer (PC), a portable battery, or the like.

Figure 2:
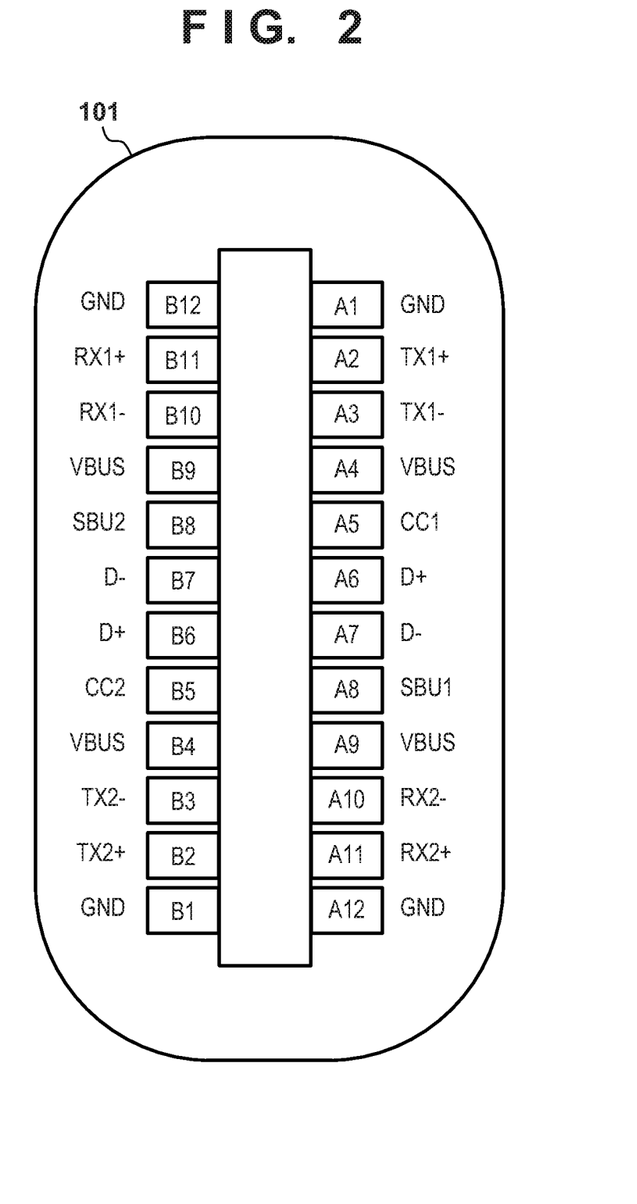
FIG. 2 is a diagram showing the arrangement of pins of a USB Type-C connector (receptacle side).

The connector 101 receives power supplied from the power supply apparatus 120. A case in which the connector 101 is a connector (receptacle side) conforming to the USB Type-C specification is described as an example in the first embodiment. The connector 101 has a pin arrangement as shown in FIG. 2. FIG. 2 is a diagram showing the arrangement of pins of a USB Type-C connector (receptacle side). The connector 101 has a point-symmetric pin arrangement. The connector 101 has a VBUS terminal for receiving power supplied from the power supply apparatus 120. The connector 101 has a Configuration Channel (CC) terminal. The connector 101 has a ground (GND) terminal serving as a reference level for signals.

The resistor 102 is a pull-down resistor for pulling down the voltage of the CC terminal of the connector 101 to a predetermined voltage. The predetermined voltage is a voltage defined under the USB Type-C specification. One end of the resistor 102 is connected to the CC terminal of the connector 101. The other end of the resistor 102 is connected to the GND terminal of the connector 101. The resistor 102 has a predetermined resistance value defined under the USB Type-C specification.

The PD communication unit 103 is connected to the CC terminal of the connector 101. The PD communication unit 103 determines whether or not the power supply apparatus 120 is a power supply apparatus conforming to the USB PD specification by performing communication conforming to the USB PD specification.

If the power supply apparatus 120 is a power supply apparatus conforming to the USB PD specification, the electronic device 100 performs communication (Power Negotiation communication, or the like) conforming to the USB PD specification by using the PD communication unit 103. By performing communication conforming to the USB PD specification, the electronic device 100 is capable of requesting, via the PD communication unit 103, the power supply apparatus 120 to supply desired power. Furthermore, the electronic device 100 is also capable of performing authentication communication conforming to the USB PD specification by using the PD communication unit 103. By performing the authentication communication conforming to the USB PD specification, the electronic device 100 is capable of making an authentication as to whether or not the power supply apparatus 120 is an authorized apparatus conforming to the USB PD specification. In the first embodiment, there are at least two power values (requested power values) that the electronic device 100 is capable of requesting from the power supply apparatus 120. One of the two requested power values corresponds to the power necessary for making an authentication as to whether the power supply apparatus 120 is an authorized apparatus conforming to the USB PD specification.

The power receiving unit 104 is connected to the VBUS terminal of the connector 101. The power receiving unit 104 supplies the components of the electronic device 100 with the necessary power by using power supplied from the power supply apparatus 120 via the VBUS terminal. The power receiving unit 104 controls power received from the power supply apparatus 120 based on the result of the communication performed by using the PD communication unit 103.

The power supply unit 105 converts power supplied from the power receiving unit 104 or the battery 106 into power with a voltage suitable for the operation of the components of the electronic device 100 and supplies the components of the electronic device 100 with power.

The battery 106 is capable of storing power needed for the electronic device 100 to operate. For example, the battery 106 is a chargeable battery such as a lithium-ion battery. The battery 106 may be a battery that can be easily removed from the electronic device 100. If power is being supplied from the power receiving unit 104 to the power supply unit 105, the battery 106 can be charged with power supplied from the power supply unit 105. Furthermore, if power is not being supplied from the power receiving unit 104 to the power supply unit 105, power can be supplied from the battery 106 to the power supply unit 105.

The first load 107 includes a control unit 107a, a user interface (UI) unit 107b, and a display unit 107c. The control unit 107a controls all of the components included in the electronic device 100. For example, the control unit 107a performs power supply control, etc. The UI unit 107b is a user interface for accepting user instructions. The control unit 107a is notified of the user instructions that the UI unit 107b has accepted. The UI unit 107b includes a power button for instructing the control unit 107a to activate the electronic device 100. The power button is configured as hardware or software. The control unit 107a activates the electronic device 100 if the power button is operated (for example, touched) by a user in a case in which the electronic device 100 is in a power OFF state and is in an activation-permitted state (a state in which the activation of the electronic device 100 is permitted). When the electronic device 100 is activated, the electronic device 100 transitions to a power ON state. The electronic device 100 consumes less power in the power OFF state than in the power ON state. The display unit 107c displays a captured image, a reproduced image, a menu image, etc. The display unit 107c includes a liquid crystal display (LCD) or the like.

The second load 108 includes a lens unit, an image sensor, an image processing unit, a recording unit, and a reproduction unit. The lens unit includes a zoom lens for adjusting the angle of view, and a focus lens for focusing on a subject. The image sensor converts optical images of photographic subjects into image signals. The image processing unit generates digital image data from the image signals generated by the image sensor. The recording unit records, to a recording medium (e.g., a memory card), the digital image data generated by the image processing unit. The reproduction unit reproduces, from the recording medium (e.g., a memory card), digital image data selected by the control unit 107a or a user.

The second load 108 consumes more power than the first load 107. The second load 108 realizes the main functions of the functions of the electronic device 100. The first load 107 realizes secondary functions of the functions of the electronic device 100. Power supplied from the power supply unit 105 is consumed as the first load 107 operates. Power supplied from the power supply unit 105 is also consumed as the second load 108 operates. The power consumed by the first load 107 and second load 108 changes depending upon the operation state of the electronic device 100.

The control unit 107a is capable of acquiring information related to the classification of the power supply apparatus 120, information related to a power supply capability of the power supply apparatus 120, or the like by communicating with the power supply apparatus 120 using the PD communication unit 103.

The third load 109, based on instructions from the control unit 107a, consumes power supplied from the power supply apparatus 120 via the VBUS terminal of the connector 101. The control unit 107a monitors the voltage supplied to the power receiving unit 104 while power is being supplied to the third load 109. The third load 109 includes a load resistance (first resistance element) 109a and a load resistance (second resistance element) 109b. When a 5V voltage is applied to the load resistance 109a, for example, a 0.5 A current flows through the load resistance 109a, for example. In this situation, the load resistance 109a consumes 2.5 W of power. When a 5V voltage is applied to the load resistance 109b, for example, a 1.5 A current flows through the load resistance 109b, for example. In this situation, the load resistance 109b consumes 7.5 W of power. Note that the power consumed by the load resistance 109a and the power consumed by the load resistance 109b are not limited to these. Furthermore, while a case in which the third load 109 includes two types of load resistances, i.e., the load resistance 109a and the load resistance 109b, is described as an example here, the third load 109 may include three or more types of load resistances.

The power consumed by the third load 109 is controlled by the control unit 107a. The control unit 107a causes the third load 109 to consume power, based on the information related to the power supply capability of the power supply apparatus 120, which is acquired through the communication performed by using the PD communication unit 103. For example, if information indicating that the power supply apparatus 120 has a 7.5 W (5V, 1.5 A) power supply capability is acquired, the control unit 107a performs control so that a 1.5 A current at maximum is supplied to the load resistance 109b for a predetermined period, and also monitors the voltage applied to the power receiving unit 104. The control unit 107a determines whether or not the power supply apparatus 120 has a 7.5 W (5V, 1.5 A) power supply capability based on whether or not a predetermined voltage is applied to an input terminal of the power receiving unit 104 that is connected to the VBUS terminal. Here, it suffices that the predetermined period is a period sufficient for the control unit 107a to determine the voltage applied to the input terminal of the power receiving unit 104, which is connected to the VBUS terminal. For example, the predetermined period can be set to around 10 msec.

Figure 3A:
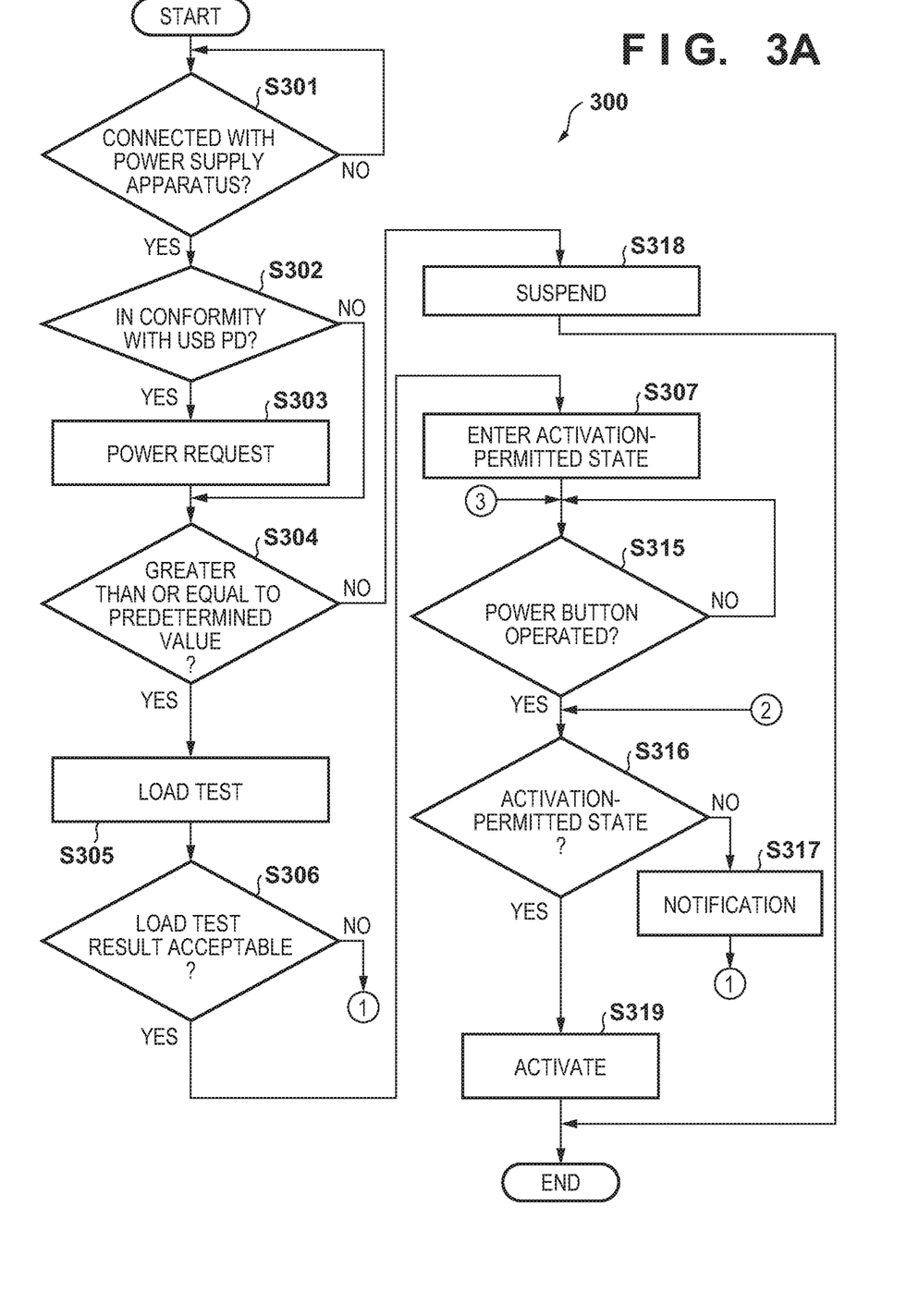
FIGS. 3A and 3B are flowcharts for illustrating an example operation 300 of the electronic device 100.
Figure 3B:
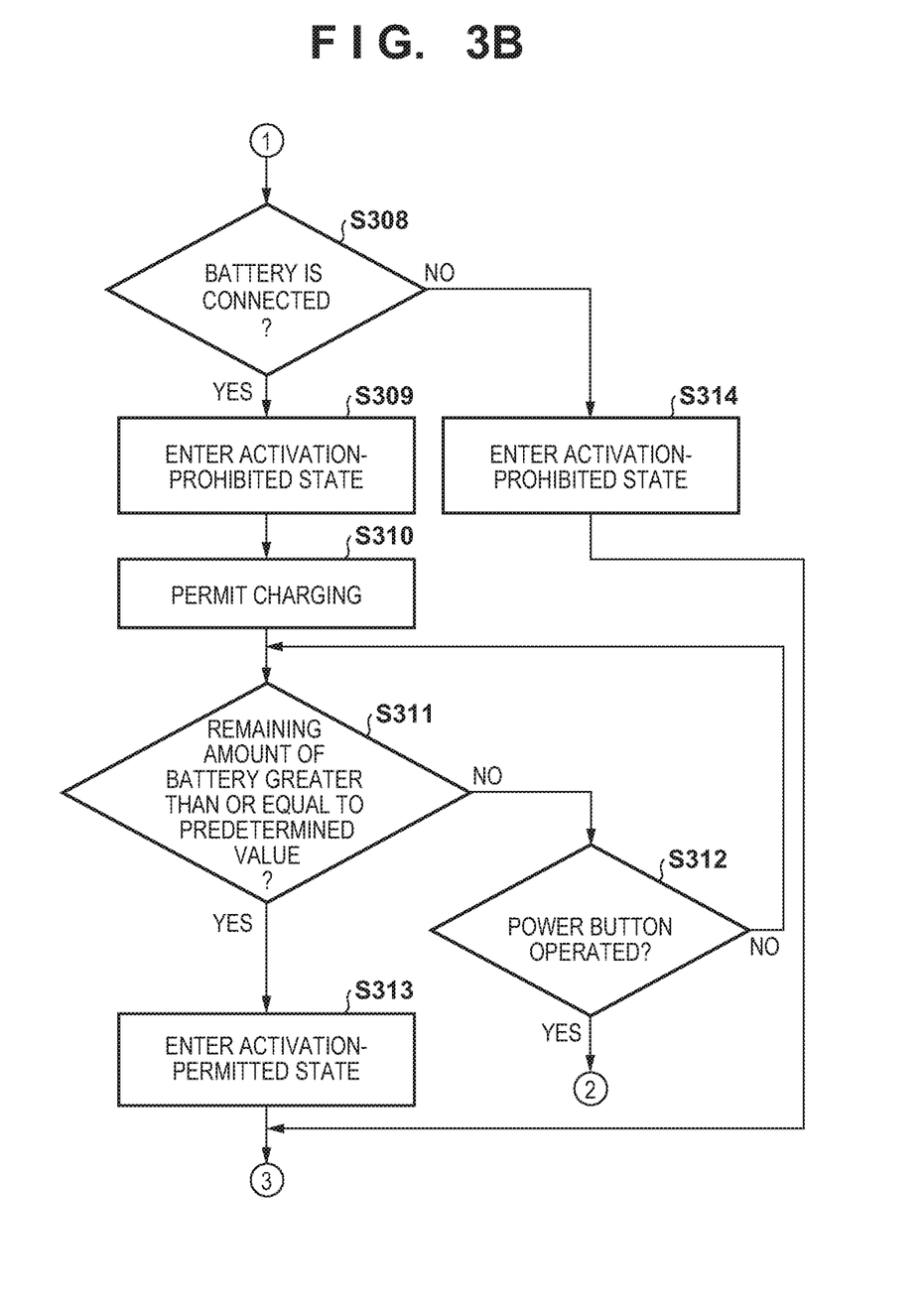

Next, an example operation 300 of the electronic device 100 is described while referring to the flowchart in FIGS. 3A and 3B.

In step S301, the PD communication unit 103 determines whether or not the power supply apparatus 120 is connected to the connector 101. If the power supply apparatus 120 is not connected to the connector 101 (NO in step S301), the example operation 300 repeats step S301. If the power supply apparatus 120 is connected to the connector 101 (YES in step S301), the example operation 300 proceeds to step S302.

In step S302, the PD communication unit 103 determines whether or not the power supply apparatus 120 is a power supply apparatus conforming to the USB PD specification. The PD communication unit 103 determines whether or not the power supply apparatus 120 is a power supply apparatus conforming to the USB PD specification by performing communication conforming to the USB PD specification. If the PD communication unit 103 performed communication conforming to the USB PD specification and could not receive predetermined information correctly, the PD communication unit 103 determines that the power supply apparatus 120 is not a power supply apparatus conforming to the USB PD specification. Furthermore, the PD communication unit 103 determines that the power supply apparatus 120 is not a power supply apparatus conforming to the USB PD specification also if the PD communication unit 103 performed communication conforming to the USB PD specification and could not receive the predetermined information within a predetermined period. Here, the predetermined information is information indicating the power supply capability of the power supply apparatus 120. While the information indicating the power supply capability of the power supply apparatus 120 is defined as information indicating that the power supply apparatus 120 is capable of supplying each of three types of power, i.e., 0.5 W (5V, 100 mA) of power, 7.5 W (5V, 1.5 A) of power, and 18 W (9V, 2 A) of power in the first embodiment, embodiments of the present disclosure are not limited to this configuration. Furthermore, it suffices that the predetermined period is a period defined in the USB PD specification. While the predetermined period is set to 310 ms in the first embodiment, embodiments of the present disclosure are not limited to this configuration. If the PD communication unit 103 determines that the power supply apparatus 120 is a power supply apparatus conforming to the USB PD specification (YES in step S302), the example operation 300 proceeds to step S303.

In step S303, the PD communication unit 103 requests the power supply apparatus 120 to supply power, by performing communication conforming to the USB PD specification. Here, it suffices that the power for which a request is made to the power supply apparatus 120 is power of a magnitude with which the electronic device 100 can operate. As described above, the information indicating the power supply capability of the power supply apparatus 120 is information indicating that the power supply apparatus 120 is capable of supplying each of 0.5 W (5V, 100 mA) of power, 7.5 W (5V, 1.5 A) of power, and 18 W (9V, 2 A) of power in the first embodiment. The PD communication unit 103 requests the power supply apparatus 120 to supply a selected one of such types of power. While a case in which a request to supply 7.5 W (5V, 1.5 A) of power is made to the power supply apparatus 120 is described as an example in the first embodiment, embodiments of the present disclosure are not limited to this configuration. Following this, the example operation 300 proceeds to step S304.

If the PD communication unit 103 determines that the power supply apparatus 120 is not a power supply apparatus conforming to the USB PD specification in step S302 (NO in step S302), the example operation 300 proceeds to step S304. Note that a configuration may be adopted such that, if the PD communication unit 103 determines that the power supply apparatus 120 is not a power supply apparatus conforming to the USB PD specification in step S302 (NO in step S302), the PD communication unit 103 determines that power conforming to the USB Type-C specification can be supplied to the power receiving unit 104.

In step S304, the control unit 107a determines whether or not the power supply capability of the power supply apparatus 120 is greater than or equal to a predetermined value. For example, the predetermined value corresponds to power sufficient for causing both the first load 107 and second load 108 to operate. For example, the predetermined value corresponds to the sum of the power consumption of the first load 107 and the power consumption of the second load 108.

For example, if the power consumption of the first load 107 is 0.5 W and the power consumption of the second load 108 is 5.0 W, the sum of these power consumptions is 5.5 W. The control unit 107a compares the information indicating the power supply capability of the power supply apparatus 120 and the sum of the power consumptions of the first load 107 and second load 108. Based on the result of such a comparison, the control unit 107a determines whether or not power sufficient for causing the first load 107 and second load 108 to operate can be supplied from the power supply apparatus 120. If the control unit 107a determines that the power supply capability of the power supply apparatus 120 is greater than or equal to the predetermined value (YES in step S304), the example operation 300 proceeds to step S305. On the other hand, if the control unit 107a determines that the power supply capability of the power supply apparatus 120 is less than the predetermined value (NO in step S304), the example operation 300 proceeds to step S318.

In step S318, the control unit 107a controls the power receiving unit 104 so that the power that the power receiving unit 104 receives from the power supply apparatus 120 becomes a predetermined suspend current. Furthermore, the control unit 107a, by controlling the PD communication unit 103, causes the PD communication unit 103 to notify the power supply apparatus 120 of information indicating that the electronic device 100 is transitioning to the suspend state. Following this, the electronic device 100 stops receiving power from the power supply apparatus 120. For example, the predetermined suspend current is 2.5 mA or less.

In step S305, the control unit 107a performs a load test for checking power supplied from the power supply apparatus 120. The load test is performed as follows. The control unit 107a drives the third load 109 and at the same time monitors the voltage supplied to the input terminal of the power receiving unit 104, which is connected to the VBUS terminal. The conditions of the load test are determined based on the information indicating the power supply capability of the power supply apparatus 120 and the sum of the power consumptions of the first load 107 and second load 108. For example, suppose that the power supply apparatus 120 is capable of supplying two types of power, e.g., 2.5 W of power and 7.5 W of power. Furthermore, suppose that the power supply apparatus 120 agrees to supply 7.5 W of power to the electronic device 100. In this case, the control unit 107a performs control so that the load resistance 109b with a power consumption of 7.5 W is driven. Furthermore, suppose that the power supply apparatus 120 is capable of supplying only one type of power, e.g., 2.5 W of power. Furthermore, suppose that the power supply apparatus 120 agrees to supply the electronic device 100 with 2.5 W of power. Suppose that the electronic device 100 has a power consumption of 5.5 W, for example. In this case, the control unit 107a performs control so that the load resistance 109a with a power consumption of 2.5 W is driven. Note that a configuration may be adopted such that, in step S305, the control unit 107a drives the third load 109 only for a period necessary for determining the voltage applied to the input terminal of the power receiving unit 104, which is connected to the VBUS terminal. Following this, the example operation 300 proceeds to step S306.

In step S306, the control unit 107a determines whether or not power necessary for the electronic device 100 to operate will be supplied from the power supply apparatus 120, based on the voltage applied to the input terminal of the power receiving unit 104, which is connected to the VBUS terminal, while the third load 109 is driven. The control unit 107a determines the result of the load test based on whether or not the voltage applied to the input terminal of the power receiving unit 104, which is connected to the VBUS terminal, while the third load 109 is driven is within a predetermined range. For example, the VBUS voltage is 5V in the first embodiment. The control unit 107a determines that the result of the load test is acceptable if the voltage applied to the input terminal of the power receiving unit 104, which is connected to the VBUS terminal, while the third load 109 is driving is within the range of 5V±0.25V. If the result of the load test is acceptable (YES in step S306), the example operation 300 proceeds to step S307. On the other hand, if the result of the load test is not acceptable (NO in step S306), the example operation 300 proceeds to step S308.

In step S307, the control unit 107a puts the electronic device 100 in the activation-permitted state (the state in which the activation of the electronic device 100 is permitted), regardless of whether or not the battery 106 is connected to the electronic device 100. Following this, the example operation 300 proceeds to step S315.

In step S308, the control unit 107a determines whether or not the battery 106 is connected to the electronic device 100. If the control unit 107a determines that the battery 106 is not connected to the electronic device 100 (NO in step S308), the example operation 300 proceeds to step S314. If the control unit 107a determines that the battery 106 is connected to the electronic device 100 (YES in step S308), the example operation 300 proceeds to step S309.

In step S309, the control unit 107a puts the electronic device 100 in an activation-prohibited state (a state in which the activation of the electronic device 100 is prohibited). Following this, the example operation 300 proceeds to step S310.

In step S310, the control unit 107a permits charging of the battery 106. The control unit 107a controls the power supply unit 105 so that charging of the battery 106 is performed by the power supply unit 105. Due to this, charging of the battery 106 is started by the power supply unit 105. Following this, the example operation 300 proceeds to step S311.

In step S311, the control unit 107a determines whether or not the remaining amount of the battery 106 is greater than or equal to a predetermined value. If the remaining amount of the battery 106 is less than the predetermined value (NO in step S311), the example operation 300 proceeds to step S312. If the remaining amount of the battery 106 is greater than or equal to the predetermined value (YES in step S311), the example operation 300 proceeds to step S313. What is meant by the remaining amount of the battery 106 being greater than or equal to the predetermined value is that a remaining amount with which the electronic device 100 can be made to operate is remained in the battery 106. If the discharge termination voltage of the battery 106 is 2.5V, for example, a configuration may be adopted such that a determination that the remaining amount of the battery 106 is greater than or equal to the predetermined value is made if the output voltage of the battery is 3.0V or more, taking voltage drop, etc., into consideration. Note that, while a case in which the remaining amount of the battery 106 is determined based on the output voltage of the battery 106 is described as an example here, embodiments of the present disclosure are not limited to this configuration. A configuration may be adopted such that the remaining amount of the battery 106 is determined based on a parameter other than the output voltage of the battery 106. For example, a configuration may be adopted such that the determination of whether or not the remaining amount of the battery 106 is greater than or equal to the predetermined value is performed, for example, by monitoring the electric charge amount supplied to the battery 106 during charging and the electric charge amount discharged from the battery 106 during discharge.

In step S312, the control unit 107a determines whether or not the power button included in the UI unit 107b has been operated (for example, touched) by a user. If the power button has been operated by a user (YES in step S312), the example operation 300 proceeds to step S316. If the power button has not been operated by the user (NO in step S312), the example operation 300 proceeds to step S311.

In step S313, the control unit 107a puts the electronic device 100 in the activation-permitted state. Charging of the battery 106 is still continued after this. When step S313 is complete, the example operation 300 proceeds to step S315.

In step S314, the control unit 107a puts the electronic device 100 in the activation-prohibited state. Following this, the example operation 300 proceeds to step S315.

In step S315, the control unit 107a determines whether or not the power button included in the UI unit 107b has been operated by a user. If the power button has been operated by a user (YES in step S315), the example operation 300 proceeds to step S316. If the power button has not been operated by a user (NO in step S315), the example operation 300 repeats step S315.

In step S316, the control unit 107a determines whether or not the electronic device 100 is in the activation-permitted state. If the electronic device 100 is not in the activation-permitted state (NO in step S316), the example operation 300 proceeds to step S317. If the electronic device 100 is in the activation-permitted state (YES in step S316), the example operation 300 proceeds to step S319.

In step S317, the control unit 107a uses the display unit 107c to notify the user that the activation of the electronic device 100 is prohibited. While a case in which the display unit 107c is used to notify a user that the activation of the electronic device 100 is prohibited is described as an example in the first embodiment, embodiments of the present disclosure are not limited to this configuration. For example, a configuration may be adopted such that another unit, such as audio, is used to notify a user that the activation of the electronic device 100 is prohibited. Following this, the example operation 300 returns to step S308.

In step S319, the control unit 107a activates the electronic device 100. For example, the control unit 107a realizes the main functions of the electronic device 100 by driving both the first load 107 and second load 108.

Hence, according to the first embodiment, the electronic device 100 determines whether or not enough power can be supplied from the power supply apparatus 120 and whether or not enough power can be supplied from the battery 106. Furthermore, if enough power cannot be supplied from either the power supply apparatus 120 or the battery 106, the electronic device 100 performs control such that a predetermined operation is limited. Due to this, according to the first embodiment, a situation in which the electronic device 100 suddenly stops during activation due to a lack of power in the electronic device 100 can be prevented. Furthermore, according to the first embodiment, if enough power cannot be supplied from either the power supply apparatus 120 or the battery 106, control is performed such that a predetermined notification is provided. Thus, users can be aware that there is a power shortage.

Note that the aspects of the disclosure are not limited to the first embodiment described above. Embodiments of the present disclosure which constitute the first embodiment, altered or modified within the scope of the disclosure, are also included within the scope of the present disclosure.

Second Embodiment

The various functions, processing, or method described in the first embodiment can also be realized by a personal computer, a microcomputer, a central processing unit (CPU), a processor, or the like using a program. With regard to the second embodiment, a personal computer, a microcomputer, a central processing unit (CPU), a processor, or the like is referred to as a "computer X" in the following description. Furthermore, in the description of the second embodiment, a program that is for controlling the computer X and that is for realizing the various functions, processing, or method described in the first embodiment is referred to as a "program Y."

The various functions, processing, or method described in the first embodiment are realized by the computer X executing the program Y. In this case, the program Y is supplied to the computer X via a computer-readable storage medium. The computer-readable storage medium in the second embodiment includes at least one out of a hard disk apparatus, a magnetic storage apparatus, an optical storage apparatus, a magneto-optical storage apparatus, a memory card, a volatile memory, a non-volatile memory, or the like. The computer-readable storage medium in the second embodiment is a non-transitory storage medium.

While exemplary embodiments are described, it is to be understood that the disclosure is not limited to the exemplary embodiments. The scope of the following claims is to be accorded the broadest interpretation so as to encompass all modifications and equivalent structures.

This application claims priority from Japanese Patent Application No. 2018-040123, filed Mar. 6, 2018, which is hereby incorporated by reference herein in its entirety.

What is claimed is:

1. An electronic device comprising:
a power receiving unit that receives power supplied from a power supply apparatus; and
a control unit that (a) determines whether a power supply capability of the power supply apparatus exceeds a predetermined capability, (b) determines whether the power supply apparatus is capable of supplying a predetermined power to the electronic device, based on a voltage applied by the power supply apparatus to the power receiving unit during a load test, in a case where the power supply capability of the power supply apparatus exceeds the predetermined capability, (c) puts the electronic device in a permitted state in which an activation of the electronic device is permitted, in a case where the power supply apparatus is capable of supplying the predetermined power to the electronic device, (d) puts the electronic device in a prohibited state in which an activation of the electronic device is prohibited, in a case where the power supply apparatus is capable of supplying power lower than the predetermined power to the electronic device and a battery is connected to the electronic device, and (e) performs a predetermined notification indicating that an activation of the electronic device is prohibited, in response to a user operation for activating the electronic device, in a case where the power supply apparatus is capable of supplying power lower than the predetermined power to the electronic device, a remaining amount of power of the battery is lower than a predetermined value, and the electronic device is in the prohibited state.

2. The electronic device according to claim 1, further comprising a charging unit that charges the battery using power supplied from the power supply apparatus to the electronic device.

3. The electronic device according to claim 2, wherein the control unit causes the charging unit to charge the battery in a case where the power supply apparatus is capable of supplying power lower than the predetermined power to the electronic device and the electronic device is in the prohibited state.

4. The electronic device according to claim 1, further comprising a connector that includes a first terminal for receiving power from the power supply apparatus and a second terminal for communicating with the power supply apparatus.

5. A method comprising:
determining whether a power supply capability of a power supply apparatus exceeds a predetermined capability;
determining, whether the power supply apparatus is capable of supplying a predetermined power to an electronic device, based on a voltage applied by the power supply apparatus to a power receiving unit of the electronic device during a load test, in a case where the power supply capability of the power supply apparatus exceeds the predetermined capability;
putting the electronic device in a permitted state in which an activation of the electronic device is permitted, in a case where the power supply apparatus is capable of supplying the predetermined power to the electronic device;
putting the electronic device in a prohibited state in which an activation of the electronic device is prohibited, in a case where the power supply apparatus is capable of supplying power lower than the predetermined power to the electronic device and a battery is connected to the electronic device; and
performing a predetermined notification indicating that an activation of the electronic device is prohibited, in response to a user operation for activating the electronic device, in a case where the power supply apparatus is capable of supplying power lower than the predetermined power to the electronic device, a remaining amount of power of the battery is lower than a predetermined value, and the electronic device is in the prohibited state.

6. A non-transitory storage medium that stores a program that, when executed, causes a computer to execute a method, the method comprising:
determining whether the power supply apparatus is capable of supplying a predetermined power to an electronic device, based on a voltage applied by the power supply apparatus to a power receiving unit of the electronic device during a load test, in a case where the power supply capability of the power supply apparatus exceeds the predetermined capability;
putting the electronic device in a permitted state in which an activation of the electronic device is permitted, in a case where the power supply apparatus is capable of supplying the predetermined power to the electronic device;
putting the electronic device in a prohibited state in which an activation of the electronic device is prohibited, in a case where the power supply apparatus is capable of supplying power lower than the predetermined power to the electronic device and a battery is connected to the electronic device; and
performing a predetermined notification indicating that an activation of the electronic device is prohibited, in response to a user operation for activating the electronic device, in a case where the power supply apparatus is capable of supplying power lower than the predetermined power to the electronic device, a remaining amount of power of the battery is lower than a predetermined value, and the electronic device is in the prohibited state.

7. The electronic device according to claim 4, wherein the connector is a USB (Universal Serial Bus) Type-C connector.

8. The electronic device according to claim 3, wherein the control unit puts the electronic device in the permitted state in a case where the remaining amount of power of the battery exceeds the predetermined value while the charging unit is charging the battery.

9. The electronic device according to claim 1, wherein the control unit activates the electronic device, in response to a user operation for activating the electronic device, in a case where the electronic device is in the permitted state.

10. The electronic device according to claim 1, wherein the predetermined capability corresponds to 0.5 W, 7.5 W, or 18 W.

11. The electronic device according to claim 1, wherein the electronic device is capable of acting as a digital camera.

12. The method according to claim 5, wherein the electronic device includes a charging unit that charges the battery using power supplied from the power supply apparatus to the electronic device.

13. The method according to claim 12, further comprising causing the charging unit to charge the battery in a case where the power supply apparatus is capable of supplying power lower than the predetermined power to the electronic device and the electronic device is in the prohibited state.

14. The method according to claim 5, wherein the electronic device includes a connector that includes a first terminal for receiving power from the power supply apparatus and a second terminal for communicating with the power supply apparatus.

15. The method according to claim 14, wherein the connector is a USB (Universal Serial Bus) Type-C connector.

16. The method according to claim 13, further comprising putting the electronic device in the permitted state in a case where the remaining amount of power of the battery exceeds the predetermined value while the charging unit is charging the battery.

17. The method according to claim 5, further comprising activating the electronic device, in response to a user operation for activating the electronic device, in a case where the electronic device is in the permitted state.

18. The method according to claim 5, wherein the predetermined capability corresponds to 0.5 W, 7.5 W, or 18 W.

19. The method according to claim 5, wherein the electronic device is capable of acting as a digital camera.

* * * * *